United States Patent
Conner

(10) Patent No.: US 7,503,659 B2
(45) Date of Patent: Mar. 17, 2009

(54) MULTIPLE LOCATION ILLUMINATION SYSTEM AND PROJECTION DISPLAY SYSTEM EMPLOYING SAME

(75) Inventor: Arlie R. Conner, Portland, OR (US)

(73) Assignee: 3M Innovative Properties Company, St. Paul, MN (US)

( * ) Notice: Subject to any disclaimer, the term of this patent is extended or adjusted under 35 U.S.C. 154(b) by 602 days.

(21) Appl. No.: 11/143,050

(22) Filed: Jun. 2, 2005

(65) Prior Publication Data

US 2006/0274288 A1   Dec. 7, 2006

(51) Int. Cl.
 G03B 21/28 (2006.01)
 H04N 5/70 (2006.01)
 G02F 1/19 (2006.01)

(52) U.S. Cl. .......................... 353/94; 353/85; 353/122; 348/800; 348/771

(58) Field of Classification Search .................... 353/31, 353/94, 99, 30, 85, 122; 362/230–231, 800, 362/555; 348/742, 743, 771, 800–802; 349/69; G02F 1/19

See application file for complete search history.

(56) References Cited

U.S. PATENT DOCUMENTS

| | | | |
|---|---|---|---|
| 5,386,250 A | 1/1995 | Guerinot | |
| 5,808,800 A | 9/1998 | Handschy et al. | |
| 5,971,545 A | 10/1999 | Haitz | |
| 6,129,437 A | 10/2000 | Koga et al. | |
| 6,195,136 B1 | 2/2001 | Handschy et al. | |
| 6,281,949 B1 | 8/2001 | Matsui et al. | |
| 6,457,833 B1 | 10/2002 | Ishikawa et al. | |
| 6,508,554 B2 | 1/2003 | Hatakeyama et al. | |
| 6,644,814 B2 | 11/2003 | Ogawa et al. | |
| 2003/0090632 A1* | 5/2003 | Kim et al. ...................... 353/31 |
| 2003/0151834 A1 | 8/2003 | Penn | |
| 2003/0193649 A1 | 10/2003 | Seki | |
| 2003/0218794 A1* | 11/2003 | Takeda et al. ................ 359/292 |
| 2004/0041744 A1 | 3/2004 | Inoue et al. | |
| 2004/0114250 A1 | 6/2004 | Kato | |
| 2004/0119950 A1 | 6/2004 | Penn et al. | |

FOREIGN PATENT DOCUMENTS

| | | |
|---|---|---|
| JP | 2001-042431 | 2/2001 |
| JP | 2004 133312 | 4/2004 |
| JP | 2004-163527 | 6/2004 |
| JP | 2004 302357 | 10/2004 |
| JP | 2004-325643 | 11/2004 |
| JP | 2005-099590 | 4/2005 |

OTHER PUBLICATIONS

Matthijs H. Keuper, Gerard Hubers, Steve Paolini, "26.1:RGB LED Illuminators for Pocket-Sized Projectors", SID 04 Digest, pp. 943-945, 2004.

* cited by examiner

Primary Examiner—Andrew T Sever

(57) ABSTRACT

An illumination system is disclosed for use with an array of imaging mirrors such as in a projection imaging system. The projection imaging system includes projection optics and first and second light source assemblies located in first and second illumination locations. The imaging mirrors are individually controllable between first and second different reflecting states to form an image, the first reflecting state causing light from the first illumination location to be reflected to the projection optics and the second reflecting state causing light from the second illumination location to be reflected to the projection optics.

14 Claims, 3 Drawing Sheets

MULTIPLE LOCATION ILLUMINATION SYSTEM AND PROJECTION DISPLAY SYSTEM EMPLOYING SAME

BACKGROUND OF THE INVENTION

The present invention relates to an illumination system, and more particularly to an illumination system providing light from multiple locations for use with an array of imaging mirrors such as in a projection imaging system.

A typical projection display system can include a source of light, illumination optics, an image-forming device, projection optics and a projection screen. The illumination optics collect light from a light source and direct it to one or more image-forming devices. The image-forming device(s), controlled by an electronically conditioned and processed digital video signal, produces an image corresponding to the video signal. Projection optics then magnify the image and project it onto the projection screen. White light sources, such as arc lamps, in conjunction with color wheels have been used as light sources for projection display systems. However, recently light emitting diodes (LEDs) have been introduced as an alternative source of light. Some advantages of LEDs include longer lifetime, higher efficiency and superior thermal characteristics.

One example of an image-forming device frequently used in digital projection systems is a digital micro-mirror device (DMD). The main feature of a DMD is an array of rotatable micro-mirrors. The tilt of each mirror is independently controlled by the data loaded in a memory cell associated with each mirror, to steer reflected light and spatially map a pixel of video data to a pixel on a projection screen. Light reflected by a mirror in an ON state passes through the projection optics and is projected onto the screen to create a bright field. On the other hand, light reflected by a mirror in an OFF state misses the projection optics, which results in a dark field. A color image may also be produced using a DMD, such as by utilizing color sequencing or alternatively by using three DMDs, one for each primary color (red, blue and green).

Existing DMDs are configured to reflect light that originates from only one side, with the individual mirrors of the DMD being controlled to either reflect the light toward projection optics (in an ON state) or to reflect the light to an absorption area or "dump zone" (in an OFF state).

BRIEF SUMMARY OF THE INVENTION

The present invention is an illumination system for use with an array of imaging mirrors such as in a projection imaging system. The projection imaging system includes projection optics and first and second light source assemblies located in first and second illumination locations. The imaging mirrors are individually controllable between first and second reflecting states to form an image, the first reflecting state causing light from the first illumination location to be reflected to the projection optics and the second reflecting state causing light from the second illumination location to be reflected to the projection optics.

DETAILED DESCRIPTION

Figure 1:
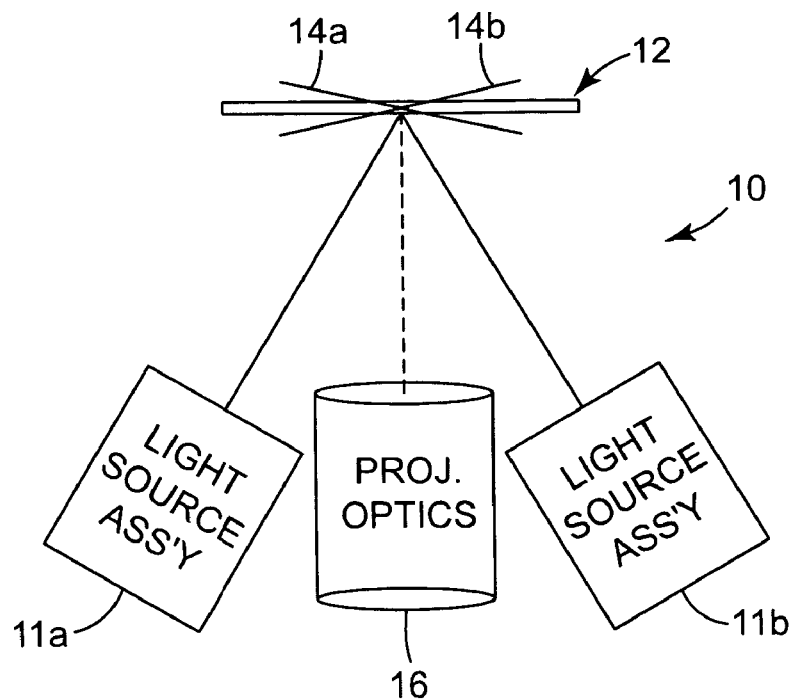
FIG. 1 is a diagram illustrating a projection imaging system according to an exemplary embodiment of the present invention.

FIG. 1 is a diagram illustrating projection imaging system 10 according to an exemplary embodiment of the present invention. Projection imaging system 10 includes light source assemblies 11a and 11b, digital micro-mirror device (DMD) 12 having mirror positions 14a and 14b, and projection optics 16. Although DMD 12 is shown in FIG. 1 as a single mirror, it will be understood by those skilled in the art that DMD 12 actually includes an array of individually controllable mirrors that are controlled based on image data to form an image, only one of which is shown in FIG. 1 for the purpose of clarity.

In operation, light is provided from one of light source assembly 11a and light source assembly 11b to DMD 12. DMD 12 is controlled so that light is either reflected toward projection optics 16 or to a "dump zone" based on image data representing the image to be displayed. When light is provided from light source assembly 11a, DMD 12 is controlled to be in mirror position 14a (reflecting toward projection optics 16) when the image data indicates the pixel is in an ON state, and DMD 12 is controlled to be in mirror position 14b (reflecting to a "dump zone") when the image data indicates the pixel is in an OFF state. Similarly, when light is provided from light source assembly 11b, DMD 12 is controlled to be in mirror position 14b (reflecting toward projection optics 16) when the image data indicates the pixel is in an ON state, and DMD 12 is controlled to be in mirror position 14a (reflecting to a "dump zone") when the image data indicates the pixel is in an OFF state.

Figure 2:
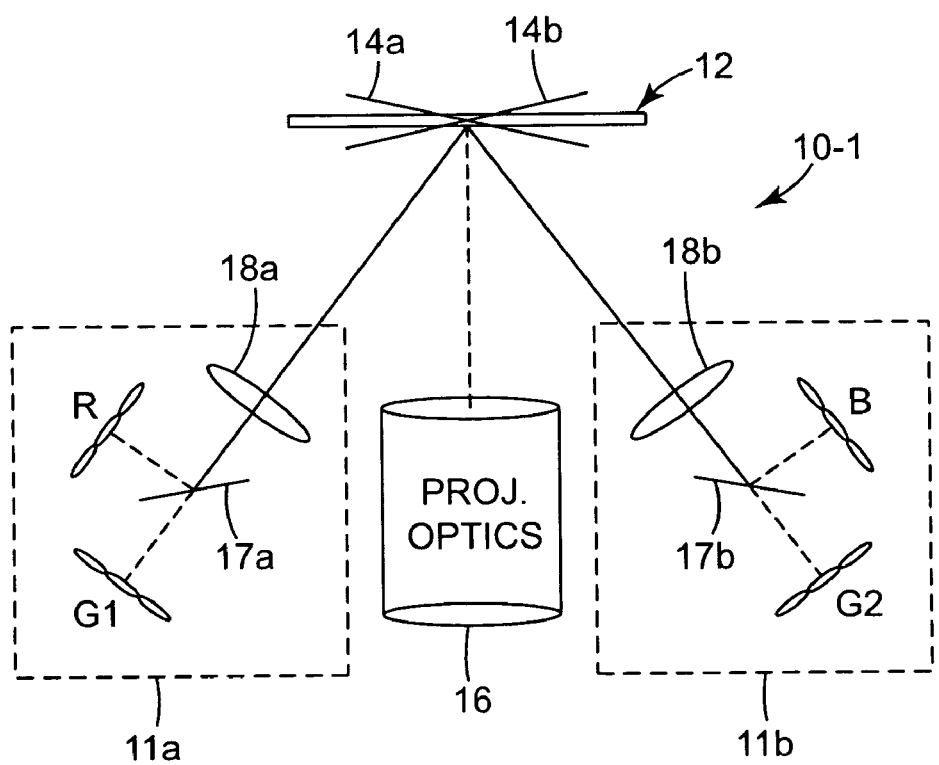
FIG. 2 is a diagram illustrating a projection imaging system according to a first particular embodiment of the present invention.

FIG. 2 is a diagram illustrating projection imaging system 10-1 according to a first particular embodiment of the present invention. System 10-1 is similar to system 10 shown in FIG. 1, and is configured with light source assemblies 11a and 11b including a plurality of LED light sources. Specifically, light source assembly 11a includes red and green LED light sources (identified as light sources R and G1, respectively), and light source assembly 11b includes blue and green LED light sources (identified as light sources B and G2, respectively). Light source assembly 11a also includes dichroic mirror 17a and lens 18a, and light source assembly 11b likewise includes dichroic mirror 17b and lens 18b.

LED light sources are continually being developed with increased efficiency and maximum output, and such commercially available LEDs will be advantageously used in exemplary embodiments of the present disclosure. Alternatively, organic light emitting diodes (OLEDs), vertical cavity surface emitting lasers (VCSELs), or other suitable light emitting devices may be used.

In operation, light is provided from one of light source assembly 11a and light source assembly 11b to DMD 12. More specifically, a selected color of light is provided from one of the LED light sources (R, G1, B or G2). This is achieved by turning on the appropriate LED light source for a known duration, and allowing the respective dichroic mirror (17a or 17b) to direct light from the active LED light source through the respective lens (18a or 18b) toward DMD 12.

Dichroic mirrors 17a and 17b include appropriate dielectric coatings to pass or reflect red, green or blue light according to filtering principles that are well known in the art. DMD 12 is controlled so that light is either reflected toward projection optics 16 or to a "dump zone" based on image data representing the image to be displayed, as described above with respect to the operation of FIG. 1.

In one configuration, light from the red, blue, and two green LED light sources is time multiplexed (also known as color sequencing or field sequential color) in a manner that presents a full color image to a viewer, such as by turning the LED light sources on and off in a sequential pattern. For example, light from each of these light sources may be provided in sequential fashion as follows:

| R | G2 | G1 | B |
|---|----|----|---|

This color sequencing scheme provides green light (from LEDs G1 and G2) for a longer time per cycle than red light (from LED R) and blue light (from LED B). Such a scheme is desirable in an exemplary embodiment because of the fact that green LEDs, in the current state of technology, are not able to produce light with as much brightness as red and blue LEDs. Thus, providing light from green LEDs for a longer amount of time during each color sequencing cycle improves the level of green brightness. The sequencing order illustrated alternates between light source assemblies 11a and 11b on the two opposite sides of the system.

In an alternative embodiment, a different sequencing order may be employed so that light is provided sequentially from the two LED light sources of light source assembly 11a and then sequentially from the two LED light sources of light source assembly 11b, rather than alternating between the two light source assemblies. One example of the sequence of light in this alternative embodiment is as follows:

| R | G1 | G2 | B |
|---|----|----|---|

Figure 3:
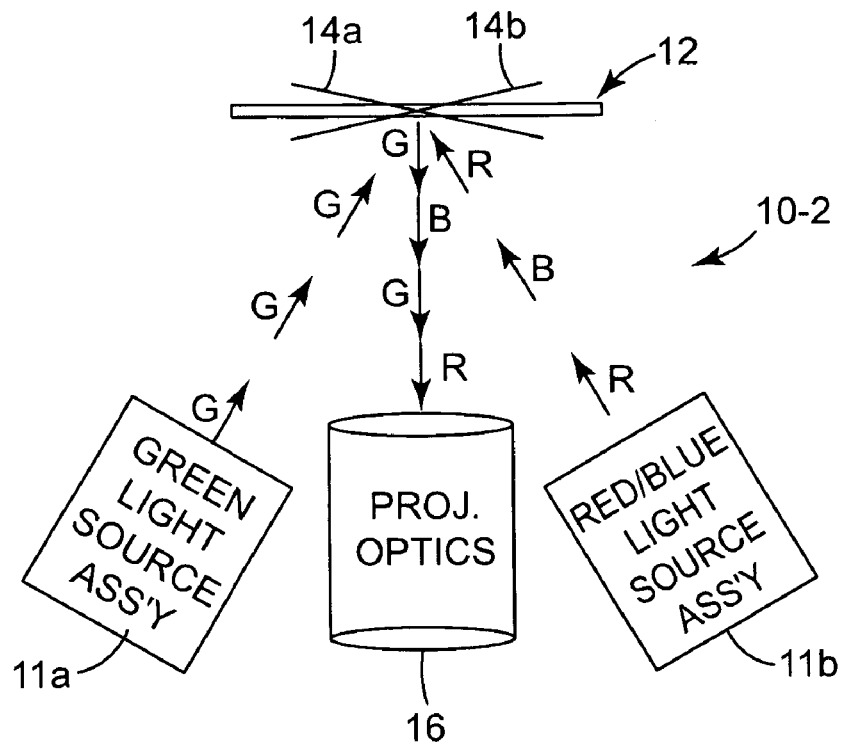
FIG. 3 is a diagram illustrating a projection imaging system according to a second particular embodiment of the present invention.

FIG. 3 is a diagram illustrating projection imaging system 10-2 according to a second particular embodiment of the present invention. System 10-2 is similar to system 10 shown in FIG. 1 and system 10-1 shown in FIG. 2, and is configured with light source assemblies 11a and 11b having color-specific light sources. Specifically, light source assembly 11a provides green light, while light source assembly 11b provides red and blue light. The green, red and blue light may be provided by green, red and blue LEDs in an exemplary embodiment, or alternatively may be provided by other color-specific light providing devices.

The diagram of FIG. 3 illustrates the color sequencing of light from green light source assembly 11a and red/blue light source assembly 11b, with arrows labeled "G" indicating green light, arrows labeled "R" indicating red light, and arrows labeled "B" indicating blue light. The sequence of light in this example is as follows:

| R | G | B | G |
|---|---|---|---|

Figure 4:
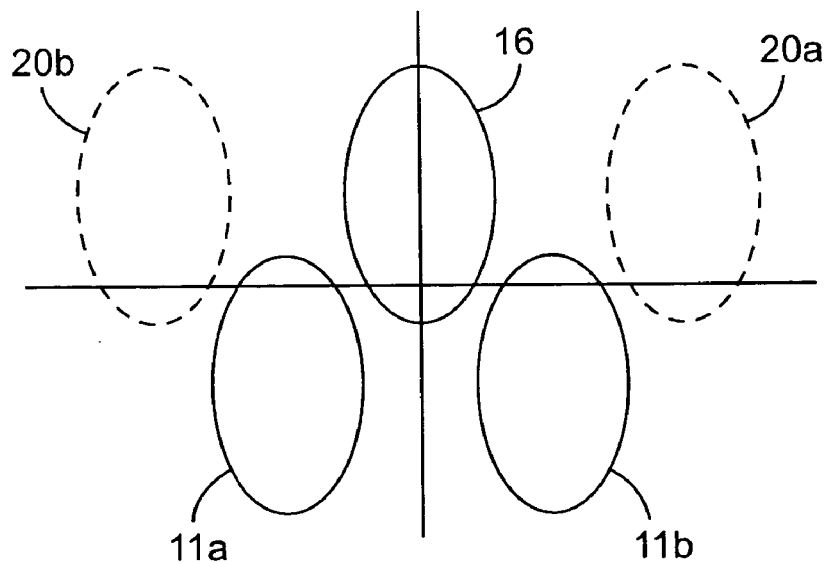
FIG. 4 is a pupil space diagram illustrating the relative locations of light source assemblies, projection optics and "dump zones" in an exemplary embodiment of the present invention.

FIG. 4 is a pupil space diagram illustrating the relative locations of light source assemblies 11a and 11b, projection optics 16 and "dump zones" 20a and 20b in an exemplary embodiment of the present invention. In order to ensure that light being reflected for absorption in a "dump zone" does not interact with light provided by one of light source assemblies 11a and 11b, one of light source assemblies 11a and 11b is located outside of a plane defined by the other light source assembly, DMD 12 and projection optics 16 (see FIG. 1). For example, in FIG. 1, light source assembly 11b could be located in a plane above the plane of the paper (which is a plane that includes light source assembly 11a, DMD 12 and projection optics 16), which will cause the "dump zone" associated with light source assembly 11b to be located below the plane of the paper. Positioning one of light source assemblies 11a and 11b outside of a plane defined by the other light source assembly, DMD 12 and projection optics 16 causes "dump zone" 20a to be located in an area that will not interfere with light source assembly 11b, and "dump zone" 20b to be located in an area that will not interfere with light source assembly 11a.

Figure 5:
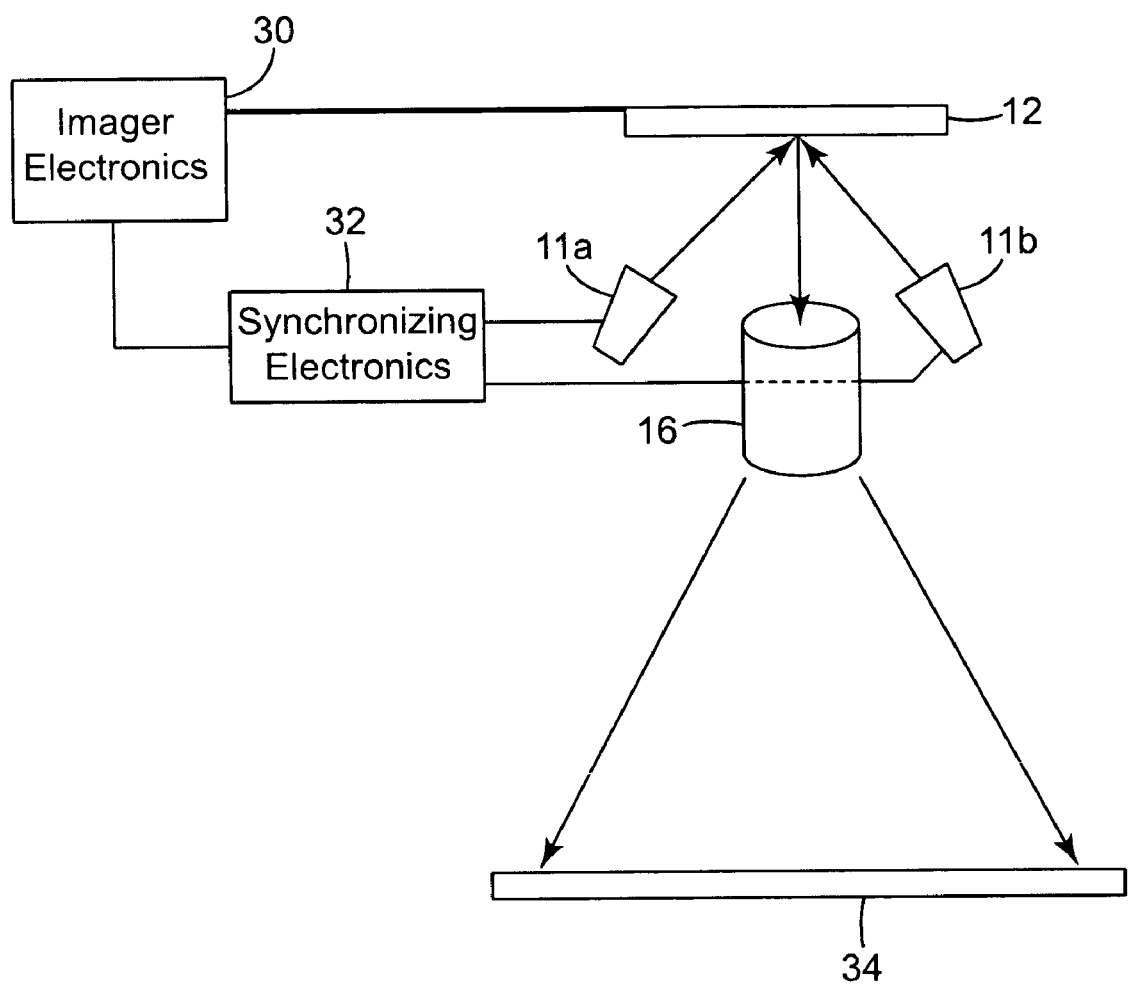
FIG. 5 is a diagram illustrating the control electronics and display screen of a projection display system according to an embodiment of the present invention.

FIG. 5 is a diagram illustrating the control electronics and display screen of a projection display system according to an embodiment of the present invention. Imager electronics 30 are operatively connected to DMD 12, to control the individual mirrors of DMD 12 according to image data so that a proper image is formed. Imager electronics 30 are also operatively connected to synchronizing electronics, which are connected to light source assemblies 11a and 11b. Synchronizing electronics, in cooperation with imager electronics 30, ensure that the color of light provided by light source assemblies 11a and 11b is precisely synchronized with the control of the states of the mirrors of DMD 12, so that monochromatic images associated with each discrete color (and origination from the two illumination locations of light source assemblies 11a and 11b) can be sequentially merged together to form a full color image. The images formed by DMD 12 are projected through projection optics 16 to display screen 34, in a manner generally known in the art.

The embodiments of the present invention described above utilize the symmetric nature of DMDs to reflect light for projection (in an ON state) and for absorption in a "dump zone" (in an OFF state) that is provided from two illumination locations. This configuration can achieve a number of potentially advantageous results. Multiple green light sources (such as LEDs) may be provided, such as described above with respect to FIG. 2, to improve the brightness of green light without reducing lifetime or efficiency by simply driving a green light source harder during each color cycle. Providing green light from multiple separated green light sources also allows for improved heat dissipation, which is important in situations where the green light sources are driven with a high level of current in order to provide the necessary brightness. In addition, some configurations of the double-sided illumination system of the present invention can be constructed with a smaller illumination engine size, because it is no longer necessary to provide all three primary colors (red, blue and green) from the same side with light provided along the same beam path. The number of dichroic mirror elements employed is also reduced (from three to two). Those skilled in the art will recognize other advantages of the ability to provide illumination from multiple locations in accordance with the principles of the present invention.

Although the present invention has been described with reference to preferred embodiments, workers skilled in the art will recognize that changes may be made in form and detail without departing from the spirit and scope of the invention. For example, although the invention has been described with respect to embodiments that provide a single primary color at a time, it would be possible for multiple light sources to work in tandem to provide light from each illumination location, so that the light provided could be either a primary color or a secondary color generated by operating both primary color light sources simultaneously. Other modifications of the light sources and other components of the multiple location illumination system are also contemplated within the scope of the present invention.

The invention claimed is:

1. A projection imaging system comprising:
   first and second light source assemblies located in first and second illumination locations;
   projection optics; and
   an array of imaging mirrors, the imaging mirrors being individually controllable between first and second different reflecting states to form an image, the first reflecting state causing light from the first illumination location to be reflected to the projection optics and the second reflecting state causing light from the second illumination location to be reflected to the projection optics;
   wherein the first and second light source assemblies each comprise a plurality of LEDs that includes at least one green LED.

2. The projection imaging system of claim 1, wherein the first light source assembly comprises a first light emitting diode pair and a first dichroic mirror element, and the second light source assembly comprises a second light emitting diode pair and a second dichroic mirror element.

3. The projection imaging system of claim 2, wherein the first light emitting diode pair comprises a red LED and a first green LED, and the second light emitting diode pair comprises a blue LED and a second green LED.

4. The projection imaging system of claim 3, wherein the first and second light assemblies are controlled to provide color sequencing in the order of: (1) red LED, (2) second green LED, (3) first green LED, (4) blue LED.

5. The projection imaging system of claim 1, wherein the second illumination location is located outside of a first plane defined by the first illumination location, the projection optics, and the imaging mirrors, so that the first reflecting state causes light from the second illumination location to be reflected to a first area and the second reflecting state causes light from the first illumination location to be reflected to a second area, the first area being located outside of the first plane and the second area being located outside of a second plane defined by the second illumination location, the projection lens and the imaging mirrors.

6. An illumination system for providing light to an array of imaging mirrors each having first and second different reflecting states and being individually controllable according to image data, comprising:
   a first light source assembly located in a first illumination location and being operable based on the image data to provide light along a first beam path oriented for reflection by the imaging mirrors to a first location in the first reflecting state and to a second location in the second reflecting state; and
   a second light source assembly located in a second illumination location and being operable based on the image data to provide light along a second beam path oriented for reflection by the imaging mirrors to the second location in the first reflecting state and to a third location in the second reflecting state;
   wherein the first and second light source assemblies each comprise a plurality of LEDs that includes at least one green LED.

7. The illumination system of claim 6, wherein the first light source assembly comprises a first light emitting diode pair and a first dichroic mirror element, and the second light source assembly comprises a second light emitting diode pair and a second dichroic mirror element.

8. The illumination system of claim 7, wherein the first light emitting diode pair comprises a red LED and a first green LED, and the second light emitting diode pair comprises a blue LED and a second green LED.

9. The illumination system of claim 8, wherein the first and second light assemblies are controlled to provide color sequencing in the order of: (1) red LED, (2) second green LED, (3) first green LED, (4) blue LED.

10. A projection display system comprising:
    first and second light source assemblies located in first and second illumination locations;
    projection optics;
    an array of imaging mirrors having first and second different reflecting states, the first reflecting state causing light from the first illumination location to be reflected to the projection optics and the second reflecting state causing light from the second illumination location to be reflected to the projection optics;
    imager circuitry operatively connected to control the array of imaging mirrors to form an image; and
    synchronization circuitry operatively connected to the imager electronics and the first and second light source assemblies for synchronizing the image formed by the imaging mirrors with a color and location of light provided by the first and second light source assemblies;
    wherein the first and second light source assemblies each comprise a plurality of LEDs that includes at least one green LED.

11. The projection display system of claim 10, wherein the first light source assembly comprises a first light emitting diode pair and a first dichroic mirror element, and the second light source assembly comprises a second light emitting diode pair and a second dichroic mirror element.

12. The projection display system of claim 11, wherein the first light emitting diode pair comprises a red LED and first green LED, and the second light emitting diode pair comprises a blue LED and a second green LED.

13. The projection display system of claim 12, wherein the first and second light assemblies are controlled to provide color sequencing in the order of: (1) red LED, (2) second green LED, (3) first green LED, (4) blue LED.

14. The projection display system of claim 10, wherein the second illumination location is located outside of a first plane defined by the first illumination location, the projection optics, and the imaging mirrors, so that the first reflecting state causes light from the second illumination location to be reflected to a first area and the second reflecting state causes light from the first illumination location to be reflected to a second area, the first area being located outside of the first plane and the second area being located outside of a second plane defined by the second illumination location, the projection lens and the imaging mirrors.

* * * * *